United States Patent [19]

Horowitz

[11] 3,801,902

[45] Apr. 2, 1974

[54] ELECTRICAL MEASURING APPARATUS EMPLOYING A PLURALITY OF CONDITION RESPONSIVE DEVICES

[75] Inventor: Martin Horowitz, Lynbrook, N.Y.

[73] Assignee: Gull Airborne Instruments, Inc., Smithtown, N.Y.

[22] Filed: July 27, 1972

[21] Appl. No.: 275,766

[52] U.S. Cl. .......................... 324/61 R, 73/304 C
[51] Int. Cl. ............................................. G01r 27/26
[58] Field of Search ................ 324/61 R; 73/304 C

[56] References Cited
UNITED STATES PATENTS

| | | | |
|---|---|---|---|
| 3,626,286 | 12/1971 | Rauchwerger | 324/61 R |
| 2,651,940 | 9/1953 | Kline | 324/61 R X |
| 2,852,739 | 9/1958 | Hansen | 324/61 R |
| 2,923,880 | 2/1960 | Mayes | 324/61 R X |
| 3,282,104 | 11/1966 | Exon | 73/304 C |
| 3,290,588 | 12/1966 | Norwich | 324/61 R |
| 3,307,398 | 3/1967 | Exon | 73/304 C |
| 3,426,271 | 2/1969 | Alais | 324/61 R |
| 3,486,108 | 12/1969 | Rosica et al. | 324/61 R |
| 3,519,923 | 7/1970 | Martin | 324/61 R |

Primary Examiner—Stanley T. Krawczewicz
Attorney, Agent, or Firm—Cooper, Dunham, Clark, Griffin & Moran

[57] ABSTRACT

This electrical measuring apparatus includes a plurality of impedance devices such as capacitors for measuring the liquid level in an aircraft fuel tank. The impedance devices are supplied with electrical energy at high frequency (e.g., 10KHz) by a remote power supply. One terminal of each of the impedance devices is connected continuously by means of a shielded conductor to the high voltage output terminal of the power supply. The other terminal of each impedance device is at or near ground potential due to its connection (by an unshielded wire) to an input terminal of an operational amplifier. By shielding the high voltage power supply line, the high frequency signal appears in the same phase at all of the impedance devices. The induction of currents in external impedance devices due to stray electrostatic and electromagnetic fields is prevented by the shielding; and, errors arising from unequal phase shifts in the high frequency lines and from stray fields are thereby avoided.

5 Claims, 3 Drawing Figures

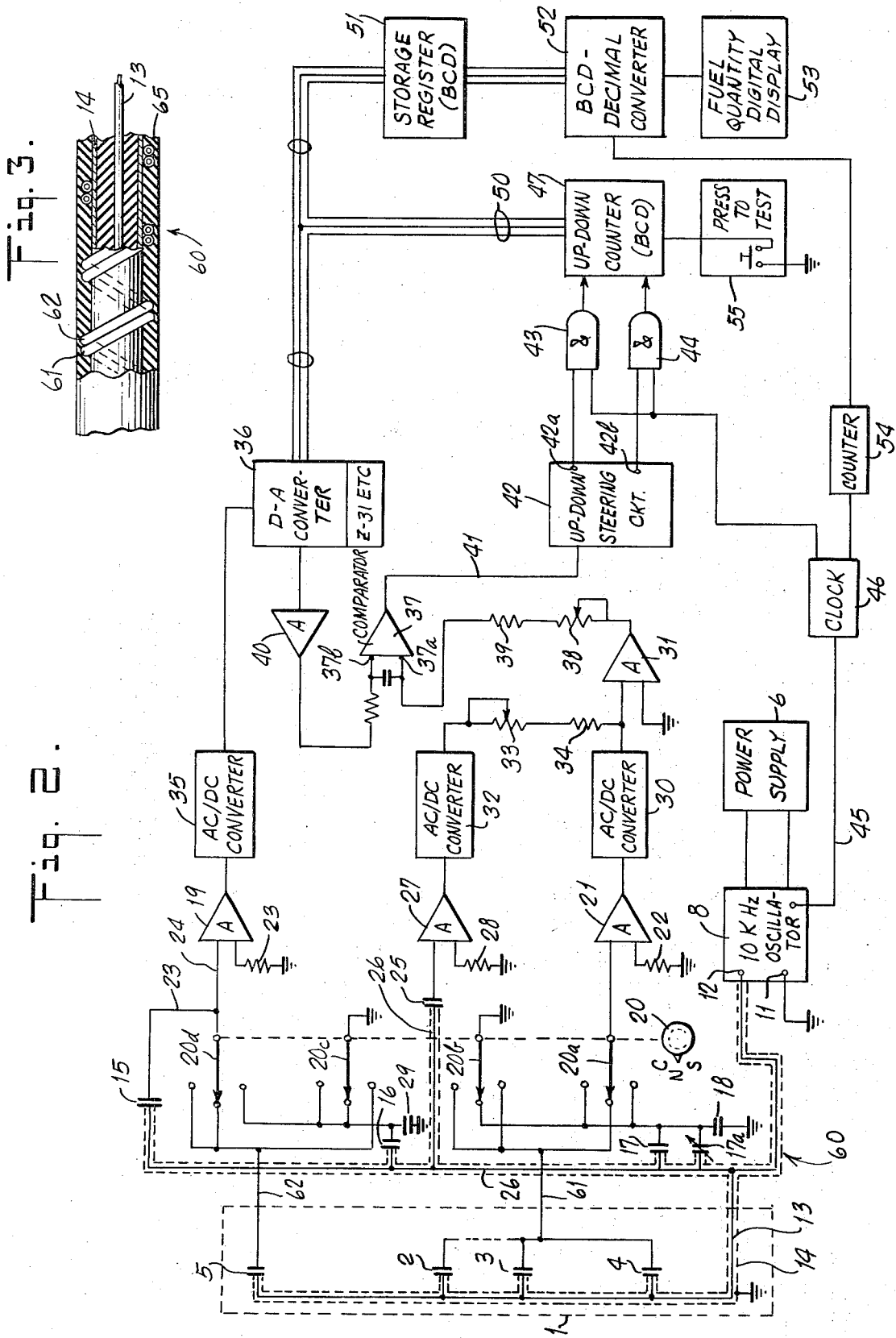

3,801,902

ELECTRICAL MEASURING APPARATUS EMPLOYING A PLURALITY OF CONDITION RESPONSIVE DEVICES

CROSS-REFERENCES

This invention is disclosed herein as applied to capacitance fuel gauges which may be those disclosed in the application of Sebastian F. DiGiacomo, entitled "FUEL IMMERSIBLE APPARATUS FOR MEASUREMENT OF MASS OF LIQUID FUEL IN A TANK", Ser. No. 237,718, filed Mar. 24, 1972.

The apparatus disclosed herein is also useful in connection with a digital indicating and control system shown and described in the copending application of Walter Hersch and Ira A. Rubel, Ser. No. 275,766 filed July 27, 1972.

This invention is nevertheless useful in connection with other types of impedance devices and in other indicating and/or control systems.

BRIEF SUMMARY

Electrical measuring systems of the prior art, employing a plurality of sensitive impedance elements and energized by alternating current, have commonly been arranged so that the variable impedance elements are connected to a plurality of high potential terminals of sources of alternating current by unshielded conductors, whereas the return or low potential lines from the impedance elements to the measuring apparatus are connected through shielded conductors. Shielding is necessary in order that stray impedances not be confused with measuring impedance. Those systems of the prior art are subject to limitations as to the maximum useful frequency, because the unshielded high voltage lines of different and variable lengths, and having different and variable output impedances have unequal capacitive loading, which result in substantial differences in the phase shifts between the power supplies and the various sensitive elelments, which consequent errors when attempts are made to combine the measurements of those elements.

The present invention goes in the opposite direction from the teachings of the prior art, and energizes all the sensitive impedance elements from a single high potential terminal, and uses shielded conductors for the high voltage supply lines and unshielded conductors for the relatively low voltage return lines. Because of the low impedances on the return lines due to the use of operational amplifiers, the phase shifts therein produced by stray capacitance are negligible. The present invention greatly extends the maximum frequency limit which has heretofore been a problem of certain types of alternating current measuring systems. The higher frequencies provide lower impedances for a given capacitive reactive impedance structure, and hence provide greater sensitivity of measurement, where the impedance structure has a characteristic which varies in response to a variable condition. In addition the present invention, because its high voltage, high frequency wire is shielded, produces a lesser spurious electromagnetic radiation output than systems of the prior art.

A representative prior art system is disclosed in Blanchard, et al., U.S. Pat. No. 3,301,056.

DRAWINGS

FIG. 2 is a wiring diagram illustrating the invention as applied to a fuel level measuring system; and FIG. 3 is a cross-sectional view showing the construction of a shielded cable in accordance with a preferred embodiment of the invention.

DETAILED DESCRIPTION

Figure 1:
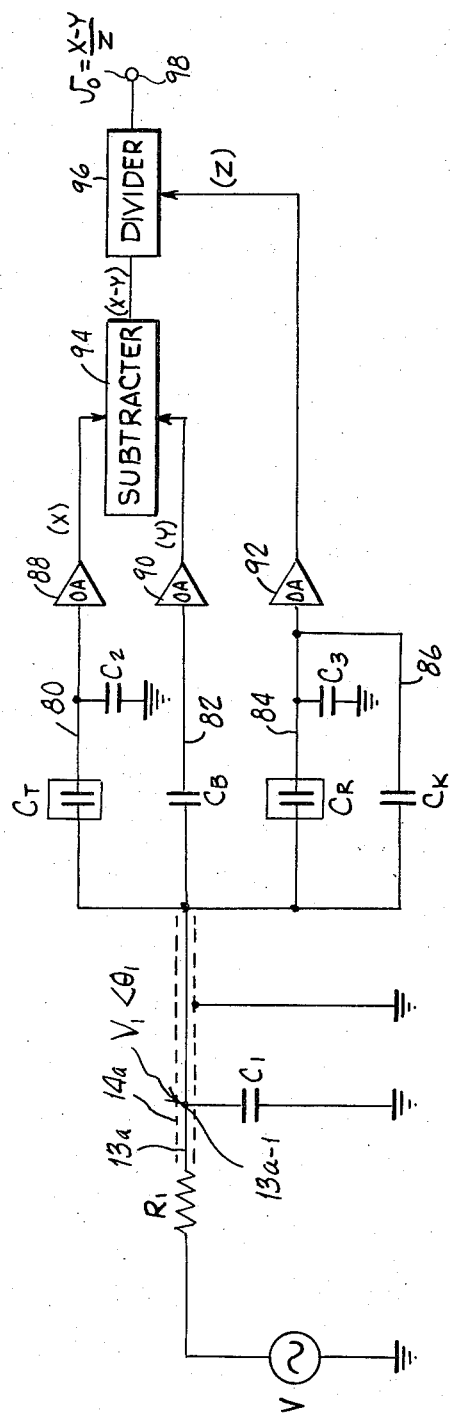
FIG. 1 is a simplified schematic circuit diagram illustrating the invention.

FIG. 1 is a simplified schematic circuit diagram illustrating the invention. An arrangement of four capacitors $C_T$, $C_B$, $C_R$ and $C_K$ is shown. The capacitors constitute a plurality of impedance devices, and the arrangement shown is one typically involving liquid level sensing. The capacitor $C_T$ represents, for example, a level responsive capacitor located in a fuel tank; the capacitance is a function of the liquid level and the electric susceptibility of the fluid medium. The capacitor $C_B$ is a fixed capacitor, whose capacitance is equal to the capacitance of $C_T$, for example, when the fuel tank is dry. The capacitor $C_R$ may be a reference (density responsive) capacitor, also located in the fuel tank, whose capacitance is a function only of the electric susceptibility of the fluid medium. The capacitor $C_K$ is a fixed capacitor useful in systems of this type. The weight of the fuel is given by the following expression:

$$\text{Fuel Weight} \sim V_o = (C_T - C_B)/(C_R + C_K) \quad (1)$$

In any signal processing circuitry utilizing such capacitors, the output signal desired is as given in equation (1) above.

In FIG. 1, cable loading capacitances $C_1$, $C_2$ and $C_3$ (i.e., stray capacitances) have no effect upon the ultimate output signal, as will be demonstrated. Cable loading capacitances cannot be ignored in a practical gaging system. Furthermore, variations in such capacitances from installation to installation, and also as a function of temperature, must not be permitted to produce gaging errors. While such gaging errors are present in prior art systems, the circuit of FIG. 1 avoids such errors.

In the circuit of FIG. 1, V is a source of alternating potential. The resistance $R_1$ is the output impedance of the potential source V (inductive and capacitive reactances at the frequencies normally involved in such fuel gaging applications are insignificant). The capacitance $C_1$, as noted above, is a stray capacitance and generally arises between the center conductor 13a and shield 14a of a shielded cable used to interconnect the voltage source V to the impedance elements $C_T$, $C_B$, $C_R$ and $C_K$. In this regard, the point designated 13a-1 may be considered to be a high potential terminal at which a potential $V_1$ appears at an angle $\theta_1$. The magnitude of $V_1$ is less than the magnitude of V due to the attenuation produced principally by capacitances $C_1$, $C_T$, $C_R$, $C_B$ and $C_K$ interacting with the output impedance $R_1$. The phase angle $\theta_1$ of the signal at the high potential terminal $V_1$ is relative to the potential V and is produced by the interaction of the impedance elements just mentioned.

The impedance devices $C_T$, $C_B$, $C_R$ and $C_K$ are all connected in parallel and are joined to the high potential terminal 13a-1 by the shielded conductor 13a, as noted. The use of such a shielded conductor is an important feature of the present invention, and provides a signal to all of the impedance devices just mentioned that is common in phase and magnitude for all the devices.

The impedance devices $C_T$, $C_B$, $C_R$ and $C_K$ are all connected by unshielded conductors 80, 82, 84 and 86 to low input impedance amplifying devices, e.g., operational amplifiers 88, 90 and 92. The outputs of the operational amplifiers 88 and 90 are designated X and Y, and they are applied to a subtracter 94 which generates as an output signal the function X-Y which is applied to a divider 96. The operational amplifier 92 generates an output signal designated Z which is applied as the other input to divider 96. Output terminal 98 from divider 96 thus produces a signal $v_o$ representative of the quantity:

$$v_o = (X-Y)/Z \qquad (2)$$

It will now be shown that the output signal $v_o$ is independent of the supply voltage source V, the impedance of the source, stray capacitances, phase shifts and the like, and that $v_o$ is dependent only upon the magnitudes of the capacitances $C_T$, $C_B$, $C_R$ and $C_K$.

It can be shown that the signal X may be represented as follows:

$$X = wAV_1C_T \angle \theta_1 + \theta_A \qquad (3)$$

in which w is the radian frequency of the voltage source V, $\theta_A$ is the phase shift, if any, introduced by the operational amplifier 88, A is the gain of the operational amplifier, and the other terms are as defined above. Since the input of the operational amplifier 88 is virtually at ground or zero potential, the stray capacitance $C_2$ has a negligible effect and alters neither the gain nor the phase shift of the operational amplifier 88 in any material fashion.

Similarly, it may be shown that the signals Y and Z are as follows:

$$Y = wAV_1C_B \angle \theta_1 + \theta_A \qquad (4)$$

$$Z = wAV_1 (C_R + C_K) \angle \theta_1 + \theta_A \qquad (5)$$

The stray capacitance $C_3$ has a negligible effect on the gain and phase shift of the operational amplifier 92, as is the case of the stray capacitance $C_2$.

For circuit arrangements in which X, Y and Z are d.c. or complex voltages, derived through the use of circuit elements (not shown) that follow the operational amplifiers 88, 90 and 92, such voltages are produced in a manner such that their magnitudes are independent of the stray capacitances $C_2$ annd $C_3$.

Combining equations (3), (4) and (5) so as to show the effect of the subtraction and division carried out by subtracter 94 and divider 96, the following equation results:

$$v_o = (X-Y)/Z = (C_T - C_B)/(C_R + C_K) \qquad (6)$$

It will be noted that the output signal $v_o$ at the output terminal 98 is independent of V, $V_1$, $R_1$, $C_1$, $C_2$, $C_3$, A, $\theta_1$, $\theta_A$ and w. Hence the values of these parameters, including any variations thereof, have no effect on the output signal which, as desired, is solely dependent upon the impedances of the impedance devices $C_T$, $C_B$, $C_R$ and $C_K$. As noted above, this effect is achieved through the use of the shielding of the high potential conductor that connects the high potential terminal of the voltage source V to the impedance devices, which are all connected in common so that they are all presented with the same input signal (magnitude and phase).

Referring to FIG. 2, which is a more detailed schematic circuit diagram showing a presently preferred embodiment of the present invention, an aircraft fuel tank diagrammatically indicated at 1 encloses three level sensing capacitors 2, 3 and 4, and a compensating capacitor 5, for the purpose of measuring the fuel level in the tank. The physical distribution of the capacitors 2, 3, 4 and 5 within the tank is shown in detail in the copending DiGiacomo application, Ser. No. 237,718, mentioned above. The present drawing is diagrammatic and is not intended to illustrate the location of the capacitors.

Power is supplied to the measuring apparatus from a power supply 6, which may be a conventional 400 cycle aircraft power supply. Energy flows from the power supply through suitable conductors to an oscillator 8 operating at a high frequency, e.g., 10KHz, and at a voltage, e.g., 10 VRMS.

The oscillator 8 has a grounded terminal 11 and an ungrounded terminal 12 connected to a conductor 13 which is part of a coaxial cable 60 including a cylindrical shield 14. The shielded conductor 13 extends to one terminal of each of the capacitors 2, 3, 4 and 5. The shield 14 is grounded and extends from the oscillator 8 throughout the length of the conductor 13 and all branches thereof to the high voltage terminals of all the impedance elements connected thereto, including capacitors 2,3,4 and 5.

The system shown includes a fixed capacitor 15, a plurality of fixed test capacitors 16 and 17, and a fixed capacitor 25, all connected to shielded conductor 13 or branches connected thereto. A variable test capacitor 17a is connected in parallel with fixed capacitor 17.

A control switch 20 has a knob for operating four contacts 20a, 20b, 20c and 20d. When the knob 20 is in its middle or N position, as shown in the drawing, the low voltage terminals of each of the capacitors 2, 3 and 4 are connected through the contact 20a to one input terminal of an operational amplifier 21, whose other input terminal is grounded through a resistor 22. The low voltage terminal of capacitor 5 is connected through contact 20d to an input terminal of an operational amplifier 19 whose other input terminal is connected to ground through a resistor 23. The test capacitor 16 has its low voltage terminal connected to ground through contact 20c. The test capacitors 17 and 17a have their low voltage terminals connected to ground through contact 20b. Capacitors 18 and 29 are connected across contacts 20a and 20c, respectively, to simultate cable loading during test.

The fixed capacitor 15 has its low voltage terminal connected through conductors 23 and 24 to the input terminal of operational amplifier 19. The fixed capacitor 25 has its high voltage terminal connected to a conductor 26 which is shielded and connected to the shielded conductor 13. The low voltage terminal of capacitor 25 is connected to an input terminal of an operational amplifier 27 whose opposite input terminal is grounded through a resistor 28.

When the switch 20 is turned from the N position to the C position shown in the drawing, then the low voltage terminals of capacitors 2, 3 and 4 are disconnected from the amplifier 21 and are connected to ground through contact 20b. The low voltage terminals of test capacitors 17 and 17a are connected to the input of amplifier 21.

When the switch 20 is moved to the S position shown in the drawing, then test capacitors 17 and 17a are substituted for capacitors 2, 3 and 4, as in the C position. Furthermore, the low voltage terminal of capacitor 5 is disconnected from amplifier 19 and is connected to ground through contact 20c. The low voltage terminal of test capacitor 16 is then connected to amplifier 19 through contact 20d.

The output terminal of operational amplifier 21 is connected through an AC-DC converter 30 to the input terminal of an operational amplifier 31. The output terminal of operational amplifier 27 is connected through an AC-DC converter 32, a variable resistor 33 and a fixed resistor 34 to the same input terminal of amplifier 31. The output terminal of operational amplifier 19 is connected through an AC-DC converter 35, and a suitable amplifier (not shown), if required, to a biasing terminal of a digital-to-analog converter 36. The output terminal of the amplifier 31 is connected through a variable resistor 38 and a fixed resistor 39 to an input terminal 37a of a comparator circuit 37. The output terminal of the digital-to-analog converter 36 is connected through an operational amplifier 40 to the other input terminal 37b of the comparator 37.

Comparator 37 produces an output signal of one value (binary value "1") when one input potential is higher than the other. If the other input potential is higher, then the output potential will be another value (binary value "0"). The output of comparator 37 is connected through a conductor 41 to an up-down steering circuit 42 having two outputs 42a and 42b connected respectively to inputs of AND circuits 43 and 44. The oscillator 8 has an output terminal connected through a conductor 45 to a clock circuit 46 having an output connected to both of the other inputs of the two AND circuits 43 and 44.

The outputs of the AND circuits 43 and 44 are connected to the two principal inputs of an up-down counter 47, which may be a binary coded decimal type. The counter 47 has a set of BCD output lines 50 which are connected to the input of the digital-to-analog converter 36, and are also connected to the input of a BCD storage register 51. The storage register 51 has a set of BCD output lines connected to a BCD-to-decimal converter 52. The converter 52 has a set of decimal output lines connected to a fuel quantity digital display 53. The output lines of the converter 52 are gated by signals from a counter 54 driven by the clock 46 so that the reading accumulated in the converter 52 is periodically transferred (e.g., once every few seconds) to the digital display 53.

The counter 47 has an input connected to a test switch 55. When the test switch 55 is closed, the inputs of the counter 47 from the AND circuits 43 and 44 are inhibited and a special code is impressed on the counter to produce a particular reading on the digital display 53. This operation tests all the circuit elements from the counter 47 through the digital display.

FIG. 3 shows a section of cable 60 connecting the tank 1 to the oscillator 8 and the display apparatus. The cable 60 comprises the shielded conductor 13 and the coaxial cylindrical shield 14. The return conductors 61 and 62 from the low voltage side of the capacitors 2, 3, 4 and 5 are wound helically around the shield 14. The shield 14 is suitably insulated from the conductor 13 and the entire cable is covered with an insulating sheath 65.

OPERATION

The capacitances of the level sensing capacitors 2, 3 and 4 are added together at the conductor 61, where all their low voltage terminals are connected. The output potentials of the converters 30 and 32 are added algebraically at the input of amplifier 31. Variable resistor 33 provides an empty tank calibration adjustment. The variable resistor 38 provides a full tank calibration adjustment. The capacitor 5 compensates for variations in the density of the fuel so that the reading on the digital display 53 presents an accurate measurement of the weight of the fuel, rather than its volume. The output of the converter 35 is connected to the reference input of the digital-to-analog converter 36. The comparator 37 balances the signal at input terminal 37a which is a continual measure of the mass of fuel in the tank, with the potential at terminal 37b which is a measure of the reading of the up-down counter. If the up-down counter 47 does not accurately reflect the quantity of the mass of fuel in the tank at any instant, then the comparator controls the up-down steering circuit to present further count-up pulses or countdown pulses to the counter 47, so that the counter is continuously being brought up-to-date as to the quantity of the mass of fuel in the tank. The output of the up-down counter is continuously fed to the storage register 51 and from there to the BCD-to-decimal converter 52. At periodic intervals controlled by clock 46 and counter 54, the reading at the output lines of the converter 52 is transferred to the digital display 53.

The present invention is concerned primarily with the measuring apparatus disclosed for delivering to the amplifiers 19, 21 and 27 signals varying with the capacitances of the capacitors 2, 3, 4, 5, 15, 16, 17, 17a and 25, said signals being undisturbed by unequal phase shifts in high voltage supply lines of unequal length. While the balancing circuits which receive those signals and drive the display 53 represent the best presently known mode of utilizing the signals, it should be recognized that the measuring apparatus is useful in connection with many other balancing, indicating and control systems.

I claim:

1. Electrical measuring apparatus, comprising:
   a. a plurality of impedance devices whose impedances vary in response to a condition to be measured, each device having an input terminal and an output terminal;
   b. a source of high frequency electrical energy having two terminals, one of which is grounded;
   c. a shielded conductor means connecting the ungrounded terminal of the source to the input terminals of all said impedance devices, to supply to all said input terminals a common input signal of the same amplitude and phase;

d. a plurality of low input impedance amplifiers, each having an input terminal maintained near ground potential, and an output terminal;

e. unshielded conductors connecting the output terminals of the impedance devices to input terminals of the amplifiers, said amplifiers being substantially unaffected by tray capacitances between the unshielded conductors and ground because of the low potential of the amplifier input terminals;

f. a divider having two input terminals and an output terminal;

g. means connecting some of the amplifier output terminals to one of the divider input terminals;

h. means connecting all the other amplifier output terminals to the other divider input terminal, said divider being effective to produce at its output terminal a signal determined by the impedances of said impedance devices and independent of the frequency and potential of the source and the gain and phase shift in the amplifiers; and i. indicator means responsive to said signal.

2. Electrical measuring apparatus as in claim 1, in which said amplifiers are operational amplifiers.

3. Electrical measuring apparatus as in claim 1, in which one of the connecting means includes:

a. a subtractor having two input terminals and an output terminal;

b. means connecting the output terminals of two of the amplifiers to the two input terminals of the subtractor; and c. means connecting the output terminal of the subtractor to one input terminal of the divider.

4. Electrical measuring apparatus as in claim 1, in which one of said connecting means includes means connecting the output terminals of two of the impedance devices to the input terminal of one of the amplifiers.

5. Electrical measuring apparatus as in claim 1, in which said unshielded conductors include means for selectively connecting said impedance devices to the input terminals of the amplifiers.

* * * * *

UNITED STATES PATENT OFFICE
CERTIFICATE OF CORRECTION

Patent No. 3,801,902         Dated April 2, 1974

Inventor(s) Martin Horowitz

It is certified that error appears in the above-identified patent and that said Letters Patent are hereby corrected as shown below:

Col. 1, line 42, "elelments, which" should read:

-- elements, with --.

Signed and sealed this 11th day of March 1975.

(SEAL)
Attest:

RUTH C. MASON
Attesting Officer

C. MARSHALL DANN
Commissioner of Patents
and Trademarks